United States Patent [19]

Norton

[11] Patent Number: 4,980,056
[45] Date of Patent: Dec. 25, 1990

[54] FAUCET-MOUNTED MICROBIAL FILTER
[75] Inventor: William W. Norton, Lincolnshire, Ill.
[73] Assignee: Culligan International Company, Northbrook, Ill.
[21] Appl. No.: 389,605
[22] Filed: Aug. 4, 1989
[51] Int. Cl.⁵ ............................................. B01D 61/08
[52] U.S. Cl. ................................... 210/137; 210/442; 210/500.36
[58] Field of Search ...................... 210/500.23, 500.36, 210/442, 262, 651, 137; 427/244, 245, 246

[56] References Cited
U.S. PATENT DOCUMENTS

| | | | |
|---|---|---|---|
| 4,401,567 | 8/1983 | Shindo et al. | 210/500.23 X |
| 4,530,809 | 7/1985 | Shindo et al. | 264/210.7 |
| 4,547,289 | 10/1985 | Okano et al. | 210/442 X |
| 4,636,307 | 1/1987 | Inoue et al. | 210/188 |
| 4,663,227 | 5/1987 | Yamamori et al. | 428/315.7 |
| 4,675,213 | 6/1987 | Yamamori et al. | 427/244 |
| 4,676,896 | 6/1987 | Horton | 210/192 |

Primary Examiner—Frank Spear
Attorney, Agent, or Firm—George H. Gerstman; Garrettson Ellis

[57] ABSTRACT

A faucet-mounted filter in which a housing is positioned in the water flow line of the faucet, in flow transmitting relation with the water flow line. A microporous, hollow fiber filter bundle is positioned to sealingly occlude water flow through the housing so that all water flow through the housing must pass through porous walls of the hollow fibers of the filter. The pores of the hollow fiber walls are no larger than 0.22 micron, as measured by the particles that the pores pass. Thus the filter is capable of microbial filtering.

27 Claims, 1 Drawing Sheet

FAUCET-MOUNTED MICROBIAL FILTER

BACKGROUND OF THE INVENTION

The supplying of microorganism-free water to users is a continuing technological problem, although water treatment is an old technology which finds use in virtually every city. Typically, the water is chlorinated to destroy microorganisms, with the chlorinating agents being added in quantities so that only minimal amounts of chlorine remain in the water after microorganisms and other organic materials have been neutralized by the free chlorine present.

One specific technical problem that remains to the present day is the problem which water that sits in stagnant manner in faucets between uses can exhibit a growth of microorganisms. Thus, when the faucet is turned on after a long period of disuse, the first aliquot of water delivered can have a relatively high bacterial count, even if the water was initially filtered and chlorinated.

This problem is addressed in Norton U.S. Pat. No. 4,676,896, in which a faucet-mounted ultraviolet radiation unit is provided for purification of water at the faucet, to inactivate bacteria that may have grown upstream in the line during a period of inactivity, and also to inactivate bacteria and virus present in the water as supplied. Such a unit of course requires electric power.

By this invention, a faucet-mounted water purifier is provided which requires no electric power, and which can be used for the reliable removal of bacteria, and even virus, from water as it passes through the faucet. Because the invention of this application is a faucet-mounted unit, it is capable of removing microorganisms from water which has sat in stagnant manner in the faucet region for a substantial period of time, with resulting bacterial growth. The faucet-mounted purifier of this invention can remove bacteria that are downstream from the conventional filters and irradiators of the prior art which are customarily used in water lines, so that even initial aliquots of water from a freshly turned-on faucet will be substantially microorganism free.

DESCRIPTION OF THE INVENTION

In this invention, a faucet-mounted filter is provided for water passing through the faucet, with the faucet defining a water flow line. A housing is positioned in flow transmitting relation with the water flow line of the faucet. Microporous, hollow fiber filter means are positioned to sealingly occlude water flow through the housing Thus, all water flow through the housing must pass through porous walls of hollow fibers of the filter means. The pores of the hollow fiber walls are no larger than 0.22 micron, with the result that the filter is capable of microbial filtering.

Preferably, the pores of the hollow fiber filter walls are sized from 0.005 to 0.05 micron, as measured by the particle sizes they pass or block. Thus, it becomes possible not only to filter microorganisms which are of the size of bacteria, but also the filter of this invention may be an anti-viral filter, for removal of the smallest microorganisms.

Preferably, the faucet is connected to a source of prefiltered water of low turbidity and solids, to prolong the useful life of the hollow fiber filter means used herein. Thus, the hollow fiber filter means in this invention is used primarily to collect only small microorganisms and other particulate matter which passes through conventional water line filters.

The microporous, hollow filters used in this invention may be made for example of polyethylene, which is oriented in the lengthwise direction of the fiber. Such hollow fibers may have elongated pores which are formed by microfibrils that are oriented in the lengthwise direction of the fiber and "knotted" portions that are connected to the microfibrils substantially at right angles thereto. The pores may be contiguous with each other from the inner wall surface to the outer wall surface, to form a stacked, multicellular structure. The porosity of the hollow fibers may be about 30 to 90 percent by volume, to exhibit a water permeability through the wall of at least about 65 ml. per $m^2$ per hour per .mm Hg. Such materials are as described in Shindo et al. U.S. Pat. No. 4,401,567.

Also, the microporous hollow fibers of this invention may be made of a hydrophobic material such as polyethylene, polypropylene, poly-4-methylpentene-1, polyvinylidenefluoride, polytetrafluoropropylene, copolymers o f hexafluoropropylene and tetrafluoropropylene, and copolymers of a fluorinated olefin monomer and an olefin monomer. Such hollow fiber materials may have a porosity of 20 to 90 volume percent, having a substantial amount (i.e. not less than 10 percent and preferably nearly 100 percent) of the surface area of the pores thereof coated with from 1 to 100 percent by weight of a hydrophilizing agent, based on the weight of the hollow fibers. The hydrophilizing agent, for example, may be a monoester of propylene glycol and a saturated fatty acid having 12 to 22 carbon atoms which is solid at about 20 degrees C. and substantially insoluble in water. Such materials are as described in Yamamori et al. U.S. Pat. No. 4,663,227.

Other patents which are significant to the type and use of porous hydrophobic fibers which may be used in accordance with this invention include Yamamori et al. U.S. Pat. No. 4,675,213; Shindo et al. U.S. Pat. No. 4,530,809; and Inoue et al. U.S. Pat. No. 4,636,307.

Preferably, the hollow fiber filter means of the faucet-mounted filter comprises a U-shaped bundle of the hollow fibers of the filter means. A sealing barrier of potting compound is provided to occlude water flow through the housing. The U-shaped bundle defines a pair of arms that sealingly extend through the sealing barrier, to present open bore ends of the hollow fibers to the housing interior at one side of the sealing barrier. The remainder of the U-shaped bundle occupies the housing interior at the other side of the sealing barrier, to provide a structure in which no fluid can flow through the housing without passing through a wall of one of the hollow fibers.

It is also preferred to provide means of draining the housing when water is not flowing therethrough. Such means is typically positioned upstream of the hollow fiber filter means, so that, when the faucet is off, the hollow fiber filter means will not stand for a long time in stagnant water. This reduces the possibility of bacteria penetrating through the hollow fiber walls by dividing and growing through the pores, which is a phenomenon that has been previously noticed with respect to bacterial filters. Preferably all flow line portions downstream of the filter are positioned to drain naturally.

Generally, a water pressure of about 40 psi or more is provided to the system. Such a water pressure will cause water to be forced through the pores of the hollow fiber filter for rapid flow when the faucet is open, even if the pores are hydrophobic.

The faucet-mounted filter of this invention is usable for difficult microorganism-removing situations. For example, it may be used to provide safe drinking water in regions where the water contains *Giardia lamblia* cysts, which are not easily inactivated by chlorination, or where the presence of any other microorganisms such as bacteria is expected Similarly, the faucet-mounted filter of this invention can be used to remove virus from water, for example polio virus or rotavirus.

Additionally, the faucet-mounted filter of this invention may be used to "polish" ultrapure electronic chip manufacturing water. Such a post treatment of previously filtered water may be valuable in that a single bacteria can straddle two conductors on the surface of an electronic chip having microfine circuitry, causing a short circuit which ruins the chip.

The microporous hollow fibers used in this invention may be hydrophobic in nature or optionally hydrophilic, as may be desired.

DESCRIPTION OF THE SPECIFIC EMBODIMENTS

Figure 1:
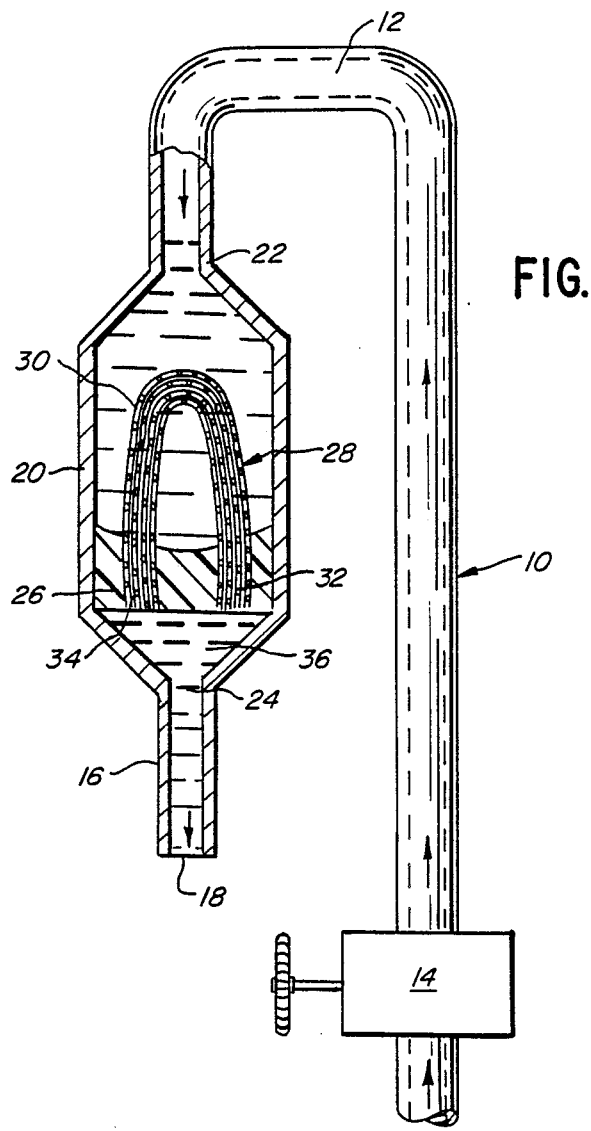
FIG. 1 is an elevational view, taken partly in section, of a faucet which carries the faucet-mounted filter of this invention.

Referring to FIG. 1, a conventional faucet 10 is disclosed having a water flow line 12 connected to a source of pressurized water, with the water flow through line 12 being controlled by a conventional valve and handle 14, which is shown in schematic manner. Water flow line 12 defines a distal, downwardly extending section 16 adjacent the water outlet end 18, which includes a filter housing 20 having an upper inlet 22 and a lower outlet 24 for flowing water.

The interior of filter housing 20 is occluded by a mass of potting compound 26 which may be centrifugally cast, if desired, in accordance with known technology for the manufacturing of corresponding potted ends of hollow fiber dialysis units or the like.

A U-shaped bundle 28 of microporous hollow fibers 30 is positioned within housing 20, with the respective arms 32, 34 of the U-shaped bundle extending through potting compound 26 so that the bores are open at their respective ends to the interior of housing 20 in the region 36 below potting compound 26. Thus, the bores of hollow fibers 30 form a U-shaped path, with both ends of the bores being open through the potting compound 26 to the region 36.

The individual hollow fibers 30 may be conventionally sized hollow fibers for filtering use, for example as described in the previously cited patents, and are preferably made of polyethylene. The size of the pores within the walls of the hollow fibers may specifically be from about 0.01 to 0.02 micron, as determined by the maximum sized particles that they pass under pressure.

Accordingly, when handle 14 of the faucet is turned on and pressurized water passes through flow line 12, the pressurized water, being at typically 40 psi or greater, is forced through the pores of hollow fibers 30 in bundle 28, resulting in the filtering of bacterial-sized particles and the like. Then, the filtered water pours out of the ends of the respective bores of hollow fibers 30 into chamber portion 36 and out of the conduit end 18, to provide the user with water which is free of bacteria, and preferably virus as well when the pores of the hollow fibers 30 are sized at the lower end of the possible size range. Cysts and protozoa of all kinds are of course also removed, since they tend to be of larger size than bacteria, along with small, nonliving particles and the like.

The water produced by the faucet-mounted filter of this invention is ultra pure, and typically suitable for critical electronic manufacturing processes, for consumption by immune-disabled individuals, or the like.

Figure 2:
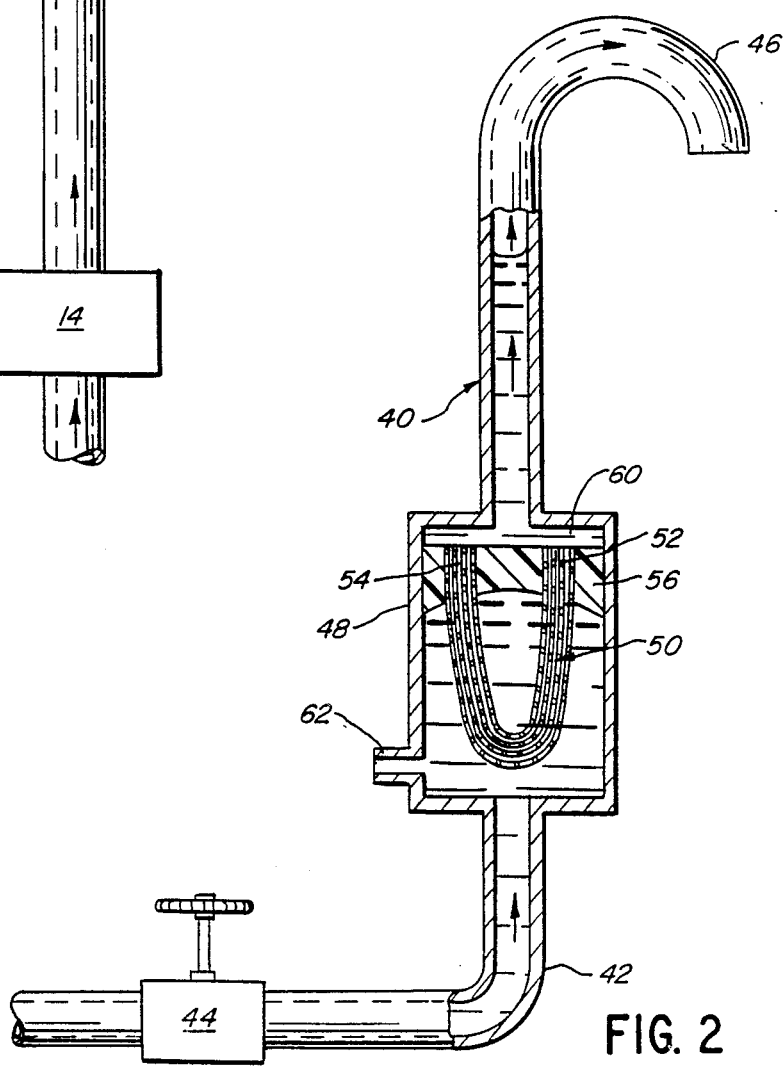
FIG. 2 is an elevational view, taken partly in section, of another embodiment of a faucet carrying the faucet-mounted filter of this invention.

Turning to FIG. 2, a second faucet-mounted filter embodiment 40 is disclosed. In this embodiment, pressurized water line 42 is controlled by a conventional faucet valve 44 and terminates in a swan neck curved end 46 for delivery of purified water to the user.

Housing 48 is provided in flow line 42. U-shaped bundle 50 of porous, hollow fibers is positioned within housing 48, with the ends of the bundle 52, 54 being mounted in a mass of potting compound 56, similar to the previous embodiment potting compound 56 holds the ends of the bores of each of the microporous, hollow fibers in the bundle in contact with chamber portion 60, positioned in this case above the bundle. Thus, as before, no flow of fluid can take place through housing 48 without the fluid passing through the porous walls of the hollow fibers of bundle 50. Such hollow fibers may be of conventional construction as described above.

Additionally, housing 48 may define a lower drain 62 which causes housing 48 to drain when faucet valve 44 is closed. This, in turn, will cause the water in the system above drain 62 to flow rearwardly when the faucet is shut-off to remove standing water from contact with U-shaped hollow fiber filter 50. This can be particularly done when the pores of hollow fiber bundle 50 are of hydrophilic nature so that the water can flow at little or no pressure through them. As stated above, this provides further assurance that bacteria cannot divide in the pores of the hollow fibers, reducing their size and migrating through pores that are normally bacteria blocking.

The flow capacity of drain 62 is low compared with the overall flow capacity of flow line 42, so that an ample quantity of processed water will flow through outlet port 46.

As an added advantage of such a drain system, when the faucet is off, water which has passed through membrane bundle 50 will flow backwards as water passes out of drain port 62. This can dislodge and remove some of the materials held back by filter bundle 50 and cause it to be removed from the system out of drain 62, to provide an increased useful life to filter bundle 50. Also, the filter may be cleaned by a pressurized backflush of water using drain port 62.

Accordingly, a faucet-mounted filter is provided for the production of ultrapure, microorganism-free water. Stagnant, bacteria-laden aliquots of water which have passed through conventional filter systems before becoming stagnant may be purified, so that ultra pure water may be provided without fail to the user.

The above has been offered for illustrative purposes only, and is not intended to limit the scope of the invention of this application, which is as defined in the claims below.

That which is claimed is:

1. In a faucet-mounted filter for water passing therethrough, with a faucet defining a water flow line, the improvement comprising, in combination; a housing positioned in said faucet in flow transmitting relation with said water flow line; microporous, hollow fiber filter means positioned in said housing to sealingly occlude water flow through said housing, whereby all water flow through said housing must pass through porous walls of hollow fibers of the filter means, the pores of said hollow fiber walls being no larger than 0.22 micron, whereby said filter is capable of microbial filtering, said housing communicating with external port means for draining said housing when water is not flowing therethrough, to reduce long-term standing water contact with said filter.

2. The faucet-mounted filter of claim 1 in which the pores of said hollow fiber walls are sized from 0.005 to 0.05 micron.

3. The faucet-mounted filter of claim 1 in which said faucet is connected to a source of prefiltered water of low turbidity and solids.

4. The faucet-mounted filter of claim 1 in which said hollow fiber filter means comprises a U-shaped bundle of said hollow fibers of the filter means; a sealing barrier of potting compound occluding water flow through said housing, said U-shaped bundle defining arms that sealingly extend through said sealing barrier to present open bore ends of said hollow fibers to the housing interior at one side of the sealing barrier, while the remainder of said U-shaped bundle occupies the housing interior at the other side of the sealing barrier.

5. The faucet-mounted filter of claim 1 in which said means for draining said housing when water is not flowing therethrough is positioned upstream of said hollow fiber filter means.

6. The faucet-mounted filter of claim 1 in which said microporous, hollow fibers are oriented in the lengthwise direction of the hollow fiber, said hollow fibers having walls defining elongated pores formed by microfibrils that are oriented in the lengthwise direction of the fiber, and knotted portions that are connected to said microfibrils in transverse relation thereto, said pores being contiguous with each other from the inner wall surface to the outer wall surface to form a stacked, multicellular structure said fibers having a porosity of about 30 to about 90 percent by volume and a water permeability through the fiber walls of at least about 65 ml. per $m^2$ per hour per mm Hg.

7. The faucet-mounted filter of claim 6 in which said microporous, hollow fibers are made of polyethylene.

8. The faucet-mounted filter of claim 1 in which said microporous, hollow fibers are made of a hydrophobic material selected from the group consisting of polyethylene, polypropylene, poly-4-methylpentene-1, polyvinylidenefluoride, polytetrafluoropropylene, copolymers of hexafluoropropylene and tetrafluoropropylene, and copolymers of a fluorinated olefin monomer and an olefin monomer: said membrane having a porosity of 20–90 volume percent, and said membrane having not less than 10 percent of the surface area of the pores thereof coated with from 1–100% by weight of a hydrophilizing agent based on the weight of said microporous membrane.

9. The faucet-mounted filter of claim 8 in which said hydrophilizing agent is a monoester of propylene glycol and a saturated fatty acid having 12 to 22 carbon atoms, said monoester being solid at about 20 degrees C. and substantially insoluble in water.

10. In a faucet-mounted filter for water passing therethrough, with a faucet defining a water flow line controlled by a valve, the improvement comprising, in combination: a housing positioned in said faucet downstream from said valve in flow transmitting relation with said water flow line; microporous, hollow fiber filter means positioned to sealingly occlude water flow through said housing, whereby all water flow through said housing must pass through porous walls of hollow fibers of the filter means, the pores of said hollow fiber walls being sized no larger than 0.22 micron, whereby microorganisms are removed from water passing through said pores.

11. The faucet-mounted filter of claim 10 in which said faucet is connected to a source of prefiltered water of low turbidity and solids.

12. The faucet-mounted filter of claim 11 in which said hollow fiber filter means comprises a U-shaped bundle of said hollow fibers of the filter means; a sealing barrier of potting compound occluding water flow through said housing; said U-shaped bundle defining arms that sealingly extend through said sealing barrier to present open bore ends of said hollow fibers to the housing interior at one side of the sealing barrier while the remainder of said U-shaped bundle occupies the housing interior at the other side of the sealing barrier.

13. The faucet mounted filter of claim 12 in which the hollow fibers of the filter means define substantially hydrophilic surfaces, and in which means for draining said housing when water is not flowing therethrough is positioned upstream and below said hollow fiber filter means, the downstream portions of said water flow line from said hollow fiber filter means being positioned above said hollow fiber filter means and defining an open outlet, whereby, when said faucet is closed, water may drain out of said housing and downstream portion to keep the hollow fiber filter means for the most part free from contact with liquid water when the faucet is closed for a substantial period of time.

14. The faucet-mounted filter of claim 11 in which said microporous, hollow fibers are made of and are oriented in the lengthwise direction of the hollow fiber, said hollow fibers having walls defining elongated pores formed by microfibrils that are oriented in the lengthwise direction of the fiber, and knotted portions that are connected to said microfibrils in transverse relation thereto, said pores being contiguous with each other from the inner wall surface to the outer wall surface to form a stacked, multicellular structure, said fibers having a porosity of about 30 to about 90 percent by volume and a water permeability through the fiber walls of at least about 65 ml. per $m^2$ per hour per mm Hg.

15. The faucet-mounted filter of claim 14 in which said microporous, hollow fibers are made of polyethylene.

16. The faucet-mounted filter of claim 11 in which said microporous, hollow fibers are made of a hydrophobic material selected from the group consisting of polyethylene, polypropylene, poly-4-methylpentene-1, polyvinylidenefluoride, polyetrafluoropropylene, copolymers of hexafluoropropylene and tetrafluoropropylene, and copolymers of a fluorinated olefin monomer and an olefin monomer: said membrane having a porosity of 2014 90 volume percent, and said membrane having not less than 10% of the surface area of the pores thereof coated with from 1–100% by weight of a hydrophilizing agent based on the weight of said microporous membrane.

17. The faucet-mounted filter of claim 16 in which said hydrophilizing agent is a monoester of propylene glycol and a saturated fatty acid having 12 to 22 carbon atoms, said monoester being solid at about 20 degrees C. and substantially insoluble in water.

18. The faucet-mounted filter of claim 13 in which the pores of said hollow fiber walls are sized from 0.005 to 0.05 micron.

19. The faucet-mounted filter of claim 18 in which the water flow through said housing is substantially a straight-through flow without significant bends in the flow path.

20. The faucet-mounted filter of claim 1 in which said faucet defines a valve controlling said water flow line, said housing being positioned downstream from said valve.

21. In a faucet-mounted filter for water passing therethrough, with a faucet defining a water flow line, controlled by a valve, the improvement comprising, in combination:
a housing positioned in said faucet; microporous, hollow fiber filter means positioned in said housing to sealingly occlude water flow through said housing, whereby all water flow through said housing must pass through porous walls of hollow fibers of the filter means, said hollow fiber filter means comprising a U-shaped bundle of said hollow fibers of the filter means; a sealing barrier of potting compound occluding water flow through said housing, said U-shaped bundle defining arms that sealingly extend through said sealing barrier to present open bore ends of said hollow fibers to the housing interior at one side of the sealing barrier, while the remainder of said U-shaped bundle occupies the housing interior at the other side of the sealing barrier; the pores of said hollow fiber walls being no larger than 0.22 micron, whereby said filter is capable of microbial filtering.

22. The faucet-mounted filter of claim 21 in which said housing communicates with external port means for draining said housing when water is not flowing therethrough, to reduce long-term standing water contact with said filter, said faucet being connected to a source of prefiltered water of low turbidity and solids.

23. The faucet-mounted filter of claim 22 in which the water flow through said housing is substantially a straight-through flow without significant bends in the flow path.

24. The faucet-mounted filter of claim 23 in which the pores of said hollow fiber walls are sized from 0.005 to 0.05 micron.

25. The faucet-mounted filter of claim 24 in which the hollow fibers of the filter means define substantially hydrophilic surfaces so that water can flow at little or no pressure through them.

26. The faucet-mounted filter of claim 1 in which the hollow fibers of the filter means define substantially hydrophilic surfaces so that water can flow at little or no pressure through them.

27. The faucet-mounted filter of claim 10 in which the hollow fibers of the filter means define substantially hydrophilic surfaces so that water can flow at little or no pressure through them.

* * * * *